(12) United States Patent
Brodie et al.

(10) Patent No.: US 7,389,347 B2
(45) Date of Patent: Jun. 17, 2008

(54) ACTIVE PROBING FOR REAL-TIME DIAGNOSIS

(75) Inventors: Mark A. Brodie, Briarcliff, NY (US); Genady Grabarnik, Scarsdale, NY (US); Sheng Ma, Briarcliff Manor, NY (US); Natalia V. Odintsova, Elmsford, NY (US); Irina Rish, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 970 days.

(21) Appl. No.: 10/826,575

(22) Filed: Apr. 16, 2004

(65) Prior Publication Data

US 2005/0235057 A1    Oct. 20, 2005

(51) Int. Cl.
G06F 15/16 (2006.01)
G06F 15/173 (2006.01)
G06F 15/177 (2006.01)

(52) U.S. Cl. ............... 709/224; 709/203; 700/195; 702/168

(58) Field of Classification Search ........ 709/200–203, 709/217–228; 719/310; 702/168
See application file for complete search history.

(56) References Cited

U.S. PATENT DOCUMENTS

| | | | |
|---|---|---|---|
| 2002/0019870 A1* | 2/2002 | Chirashnya et al. | 709/224 |
| 2003/0033347 A1* | 2/2003 | Bolle et al. | 709/107 |
| 2003/0093514 A1* | 5/2003 | Valdes et al. | 709/224 |
| 2003/0133599 A1* | 7/2003 | Tian et al. | 382/118 |
| 2004/0064597 A1* | 4/2004 | Trewin | 710/8 |
| 2004/0068496 A1* | 4/2004 | Bergman et al. | 707/4 |
| 2004/0117478 A1* | 6/2004 | Triulzi et al. | 709/224 |
| 2005/0097207 A1* | 5/2005 | Gluhovsky et al. | 709/224 |
| 2005/0223091 A1* | 10/2005 | Zahavi et al. | 709/224 |
| 2005/0223092 A1* | 10/2005 | Sapiro et al. | 709/224 |

OTHER PUBLICATIONS

U.S. Appl. No. 10/676,244, filed Sep. 30, 2003, M.A. Brodie et al.
A. Frenkiel et al., "EPP: A Framework for Measuring the End-to-End Performance of Distributed Applications," Proceedings of Performance Engineering 'Best Pratices' Conference, IBM Academy of Technology, pp. 1-32, 1999.
"Using Keynote Measurements to Evaluate Content Delivery Networks," White Paper, www.keynote.com, pp. 1-5, 2000.
M. Brodie et al., "Optimizing probe selection for fault localization," 12th International Workshop on Distributed Systems: Operation and Management DSOM'2001, France, pp. 1-12, Oct. 2001.

(Continued)

*Primary Examiner*—Haresh N Patel
(74) *Attorney, Agent, or Firm*—Mark Wardas; Ryan, Mason & Lewis, LLP (57) ABSTRACT

Improved problem diagnosis techniques for use in accordance with computing systems, e.g., distributed computing systems, are disclosed. In one aspect of the invention, a technique for diagnosing a problem associated with a computing system comprises the following steps/operations. One or more probes are executed in accordance with at least a portion of a previously selected probe schedule. When a result of one or more of the probes of the previously selected probe schedule indicates, at least, a potential problem associated with the computing system, one or more probes which optimize at least one criterion are selected in real-time. The one or more selected probes are executed so as to diagnose the potential problem.

1 Claim, 7 Drawing Sheets

OTHER PUBLICATIONS

M. Brodie, et al., "Intelligent Probing: A Cost-Efficient Approach to Fault Diagnosis in Computer Networks," IBM Systems Journal, vol. 41, No. 3, pp. 372-385, 2002.

S. Kliger et al., "A Coding Approach to Event Correlation," IM, pp. 1-12, 1997.

B. Gruschke, "Integrated Event Management: Event Correlation Using Dependency Graphs," DSOM'98, pp. 1-12, 1998.

V. Paxson, "End-to-End Internet Packet Dynamics," Proceedings of SIGCOMM, IEEE/ACM Transactions on Networking, vol. 7, No. 3, pp. 277-292, Jun. 1999.

* cited by examiner

DEPENDENCY MATRIX

| PROBLEM / PROBE | WS | AS | DBS | R | HWS | HAS | HDBS |
|---|---|---|---|---|---|---|---|
| pWS | 1 | 1 | 1 | 1 | 1 | 1 | 1 |
| pAS | 0 | 1 | 1 | 1 | 0 | 1 | 1 |
| pDBS | 0 | 0 | 1 | 1 | 0 | 0 | 1 |
| pingR | 0 | 0 | 0 | 1 | 0 | 0 | 0 |
| pingWS | 0 | 0 | 0 | 1 | 1 | 0 | 0 |
| pingAS | 0 | 0 | 0 | 1 | 0 | 1 | 0 |
| pingDBS | 0 | 0 | 0 | 1 | 0 | 0 | 1 |

PROBES:

pWS - WEB PAGE ACCESS
pAS - APPLICATION SERVER ACCESS
pDBS - DATABASE QUERY
pingR - PING ROUTER
pingWS - PING WEB SERVER
pingAS - PING APPLICATION SERVER
pingDBS - PING DATABASE SERVER

ACTIVE PROBING FOR REAL-TIME DIAGNOSIS

FIELD OF THE INVENTION

The present invention relates generally to management of distributed systems and, more particularly, to real-time diagnosis of faults and performance degradations in distributed systems.

BACKGROUND OF THE INVENTION

It is generally a goal of distributed systems, with respect to problem diagnosis, to avoid disastrous scenarios through prompt execution of remedial actions. For example, in IP (Internet Protocol) network management, one would like to quickly identify which router or link has a problem when a failure or performance degradation occurs in the network. In the e-commerce (electronic commerce) context, an objective may be to trace the root-cause of unsuccessful or slow user transactions (e.g., purchase requests sent through a web server) in order to identify whether the problem is a network problem, a web or back-end database server problem, etc. Another example is monitoring, diagnosis and prediction of the health of a large cluster system containing hundreds or thousands of workstations performing distributed computations (e.g., Linux clusters or GRID-computing systems).

One approach to problem diagnosis in distributed computing systems and networks utilizes "probes." It is known that a probe is an end-to-end transaction (e.g., ping or trace-route command, an e-mail message, a web-page access request, or an e-business transaction) sent from a probing workstation to another component of a distributed system in order to test a particular service (e.g., IP connectivity, database-access or web-access). A probe returns a set of measurements, such as response times and status code (OK/not OK), and is often used to test compliance with the service-level agreements (SLAs).

Probing technology has been used mainly for measuring compliance with an SLA (e.g., IBM Corporation's EPP tool as described in A. Frenkiel et al., "EPP: A Framework for Measuring the End-to-End Performance of Distributed Applications," Proceedings of Performance Engineering 'Best Practices' Conference, IBM Academy of Technology, 1999; and the Keynote product as described in "Using Keynote Measurements to Evaluate Content Delivery Networks" available on the World Wide Web at keynote.com/services/html/product_lib.html), rather than for the purpose of problem diagnosis or problem determination (PD).

Recent work by M. Brodie et al., (e.g., "Optimizing probe selection for fault localization," Distributed Systems Operation and Management, 2001; "Intelligent Probing: A Cost-Efficient Approach to Fault Diagnosis in Computer Networks," IBM Systems Journal 41(3): 372-385; and U.S. patent application identified as Ser. No. 10/676,244, now U.S. Pat. No. 6,167,998, filed on Sep. 30, 2003 and entitled "Problem Determination Using Probing.") proposed to use probing for diagnosis. However, the work focused mainly on pre-planned, fixed probe sets, which are scheduled to run periodically. Because the probe set is computed off-line, it needs to be able to diagnose all possible problems which might occur. However in practice, many of these problems may in fact never happen, and running the complete set of pre-planned probes might be quite wasteful.

Another disadvantage of pre-planned probe sets is that because the probes run periodically at regularly scheduled intervals, there may be a considerable delay in obtaining information when a problem occurs. It is clearly desirable to detect the occurrence of a problem as quickly as possible. Furthermore, once the occurrence of a problem has been detected, additional information may be needed to diagnose the problem precisely. This information may not be obtainable from the results of the pre-planned probes.

Another commonly used approach involves performing event correlation (see, e.g., S. Kliger et al., "A Coding Approach to Event Correlation," IM 1997; and B. Gruschke et al., "Integrated Event Management: Event Correlation Using Dependency Graphs," DSOM 1998) for identifying root-causes of problems. Problem determination is performed by analyzing alarms emitted by devices when a problematic situation occurs.

However, in event correlation, unlike the probing scheme, events are "reactive" to a situation and require intensive instrumentation, which is only possible in a tightly managed environment. Moreover, event correlation uses a "passive" approach that requires handling potentially huge volumes of events often unrelated to the problem of interest. Further, in contrast, the probing scheme uses test transactions that can be configured and executed without additional instrumentation of the existing system.

There is also related work on performance measurement based on probing described in V. Paxson, "End-to-end Internet packet dynamics," Proceedings of SIGCOMM, pp. 139-152, 1997.

Thus, a need exists for improved problem diagnosis techniques for use in accordance with distributed systems.

SUMMARY OF THE INVENTION

The present invention provides improved problem diagnosis techniques for use in accordance with computing systems, e.g., distributed computing systems.

In one aspect of the invention, a technique for diagnosing a problem associated with a computing system comprises the following steps/operations. One or more probes are executed in accordance with at least a portion of a previously selected probe schedule. When a result of one or more of the probes of the previously selected probe schedule indicates, at least, a potential problem associated with the computing system, one or more probes which optimize at least one criterion are selected in real-time. The one or more selected probes are executed so as to diagnose the potential problem.

The step/operation of selecting in real-time one or more probes which optimize at least one criterion may further comprise the step/operation of selecting in real-time one or more probes which maximize information gain relating to the potential problem.

Further, the technique may comprise the step/operation of analyzing results of the execution of the one or more selected probes using a probabilistic inference. The step/operation of analyzing results of the execution of the one or more selected probes using a probabilistic inference may further comprise the step/operation of analyzing results of the execution of the one or more selected probes using a Bayesian network. The step/operation of analyzing results of the execution of the one or more selected probes using a probabilistic inference may further comprise the step/operation of analyzing results of the execution of the one or more selected probes using one or more prior fault probabilities for one or more system components. The technique may further comprise the step/operation of repeating the step/operation of selecting in real-time one or more probes which optimize at least one criterion and the step/operation of analyzing results of the execution of the one or more selected probes until the a particular level of diagnostic confidence is reached.

Still further, the technique may comprise the step/operation of preselecting sets of probes to be executed. The step/operation of preselecting sets of probes to be executed may further comprise the step of preselecting a problem detection probe set (DPS) and a problem localization probe set (LPS) to be executed, wherein probes of the DPS are intended to cover any problem and probes of the LPS are intended to localize a problem detected by a probe of the DPS.

In another aspect of the invention, a technique for diagnosing a problem associated with a computing system comprises the following steps/operations. One or more probes which optimize at least one criterion are selected online, when a result of an execution of one or more probes of at least a portion of a previously selected probe schedule indicates, at least, a potential problem associated with the computing system. The one or more selected probes are executed so as to diagnose the potential problem.

It is to be appreciated that the terms "real-time" and "online," as used in accordance with the present invention, are intended to describe the fact that the selection of one or more probes which optimize at least one criterion (e.g., probe that will likely yield the most information about a problem) is advantageously conditioned on one or more previous probe results (e.g., outcomes or observations). In the conventional pre-planned approach, described above, there is no optimal probe selection that is based on previous results, rather the pre-planned approach merely executes every probe that is in its schedule or routine regardless of probe results previously obtained.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The following description will illustrate the invention using an exemplary distributed system in the form of a distributed computing environment. It should be understood, however, that the invention is not limited to use with any particular type of computing environment. The invention is instead more generally applicable for use with any computing environment in which it is desirable to provide improved problem diagnosis.

As will be illustratively explained below, the present invention provides generic techniques for real-time problem diagnosis of complex, multi-component systems, and particularly in a distributed systems management environment. The approach, referred to as "active probing," improves on conventional methods in problem determination, for example, by allowing a more adaptive and cost-efficient way of selecting measurements (e.g., based on information theory), and an efficient method for performing the real-time diagnosis using probabilistic inference in Bayesian networks. Combining probabilistic inference with active probing yields an adaptive diagnostic engine that asks the right questions at the right time, i.e., dynamically selects probes that provide maximum information gain about the current system state. The following detailed description also provides a description of a system architecture that implements active probing.

In accordance with the illustrative embodiments described below, active probing may use well-known probabilistic reasoning in Bayesian networks (see, e.g., J. Pearl, "Probabilistic Reasoning in Intelligent Systems," Morgan Kaufmann, San Mateo, Calif., 1988, the disclosure of which is incorporated herein by reference) combined with well-known information-theoretic approaches (see, e.g., T. M. Cover et al., "Elements of Information Theory," New York, John Wiley & Sons, 1991, the disclosure of which is incorporated herein by reference), and allows fast online inferences about the current system state via active selection of only a small number of most-informative tests. The invention provides significant improvement over previously proposed pre-planned probing approaches, reducing both the number of probes (e.g., by up to 75% in experiments with practical applications), and the time needed for diagnosing the problem.

In general, an active probing technique of the invention issues probes on demand in real-time (rather than on a pre-planned basis), whenever more information is needed, and makes online problem diagnosis based on analysis of probe outcomes. The active probing technique of the invention may include the following steps/phases: (1) a planning phase; and (2) an online phase.

Given a set S of all available probes, the planning phase builds two subsets of S. The first subset, referred to as the detection probe set (DPS), allows to detect any problem occurring in the system. The second subset, referred to as the localization probe set (LPS), allows to diagnose (localize) the problem. DPS and LPS subsets are selected in order to optimize some objective function. In general, one objective may be to minimize the total cost of probing. If all probes have equal cost, one objective may be to minimize the number of probes. The planning phase may include the following steps.

(1) Accept as an input a set S of probes available in a system. Find an optimal subset LPS of S that is capable of diagnosing exactly the same set of problems as the probes in S. This step may utilize existing probe planning techniques. By way of example, this step may employ existing probe planning techniques using a dependency matrix to describe the relationship between probe outcomes and states of system components, for example, see work by M. Brodie et al.: "Optimizing probe selection for fault localization," Distributed Systems Operation and Management, 2001; "Intelligent Probing: A Cost-Efficient Approach to Fault Diagnosis in Computer Networks," IBM Systems Journal 41(3): 372-385; and U.S. patent application identified as Ser. No. 10/676,244, now U.S. Pat. No. 6,167,998, filed on Sep. 30, 2003 and entitled "Problem Determination Using Probing," the disclosures of which are incorporated by reference herein.

(2) Select an optimal subset of LPS, referred to as the DPS, that "covers" all problems, i.e., allows detection of any problem in the system. A methodology for selecting the detection probe set will be provided below.

A main purpose of the online phase is to analyze the probe outcomes in real time and diagnose (localize) the problem(s) such as failed nodes, etc. The online phase may include the following steps.

(1) Problem detection: probes from the DPS are executed according to the selected schedule.

(2) Problem localization: this step is executed if an outcome of any probe in the set of step 1 of the online phase indicates a problem. The system starts diagnosing the problem by selecting a probe (called active probe) which optimizes one or more certain criterion. The invention may use an information-theoretic approach that selects the most-informative probe next (i.e., the probe that maximizes information gain about the unknown system state). The probe results may be analyzed by a probabilistic inference engine to determine the most likely diagnosis. If a more precise diagnosis is needed, the next most-informative probe is selected and sent. This process repeats until the diagnosis cannot be further refined, i.e., until the problem is completely determined. The methodology for diagnosis based on a set of current probe outcomes may employ Bayesian inference (see, e.g., J. Pearl, "Probabilistic Reasoning in Intelligent Systems," Morgan Kaufmann, San Mateo, Calif., 1988, the disclosure of which is incorporated herein by reference).

The inventive approach has many advantages, some of which are as follows.

(i) A much smaller number of probes need to be executed on a regular basis (i.e., only probes needed for problem detection) compared to the preplanned probing approach.

(ii) Online diagnosis is performed faster because of requesting only the most relevant probes instead of waiting for outcomes of all prescheduled probes.

(iii) The diagnosis methodology based on probabilistic Bayesian inference outputs confidence of diagnosis (e.g., how likely is the diagnosis given the measurements observed so far), rather than just a list of problems found.

(iv) The probabilistic diagnosis methodology handles, in a principled way, different prior probabilities of faults at different components (not handled by previous probing and event-correlation approaches).

Figure 1:
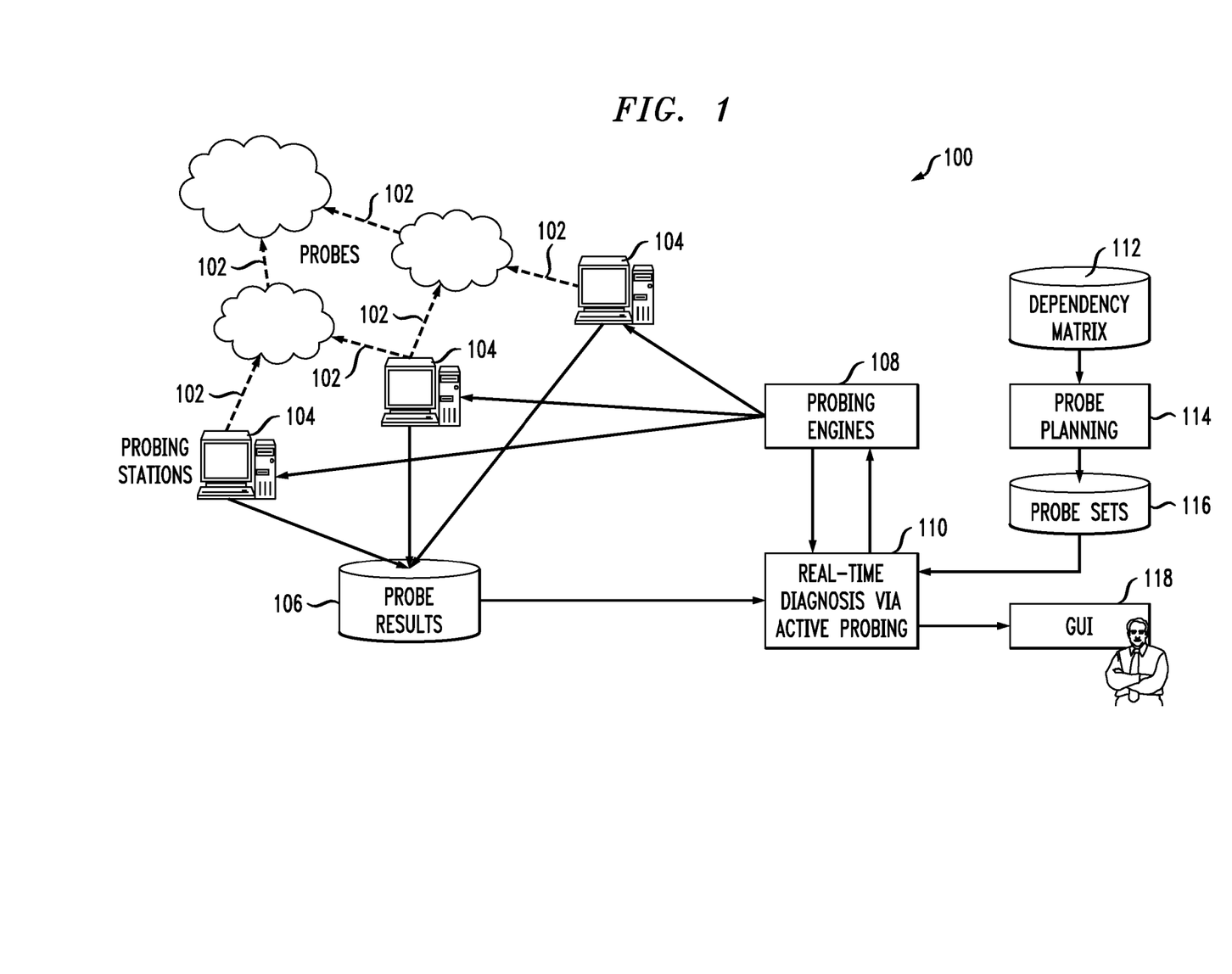
FIG. 1 is a block diagram illustrating an overview of a probing environment, according to an embodiment of the present invention.

Referring initially to FIG. 1, a block diagram illustrates an overview of a probing environment, according to an embodiment of the present invention. As shown, environment 100 includes probes 102, probing stations 104, probe results store 106, probing engines 108, active probing real-time diagnosis engine 110, dependency matrix store 112, probe planning module 114, probe sets store 116, and graphical user interface 118.

In general, initial information about all possible probes in the system, the system components and dependencies between them, represented as a dependency matrix 112, is passed to probe planning module 114. Probe planning module 114 constructs probe subsets for problem detection (DPS) and localization (LPS). These subsets are stored in probe sets store 116. This information is used by real-time diagnosis engine 110. Probing stations 104 run a prescheduled set of probes (DPS) 102. Probe results are collected in store 106 and analyzed by the real-time diagnosis engine 110. Real-time diagnosis engine 110 can send messages through probing engines 108 to probing stations 104, requesting to execute particular probes (active probes). A system administrator or other system user may interact (e.g., enter data, view data, etc.) with real-time diagnosis engine 110 via graphical user interface (GUI) 118.

Figure 2:
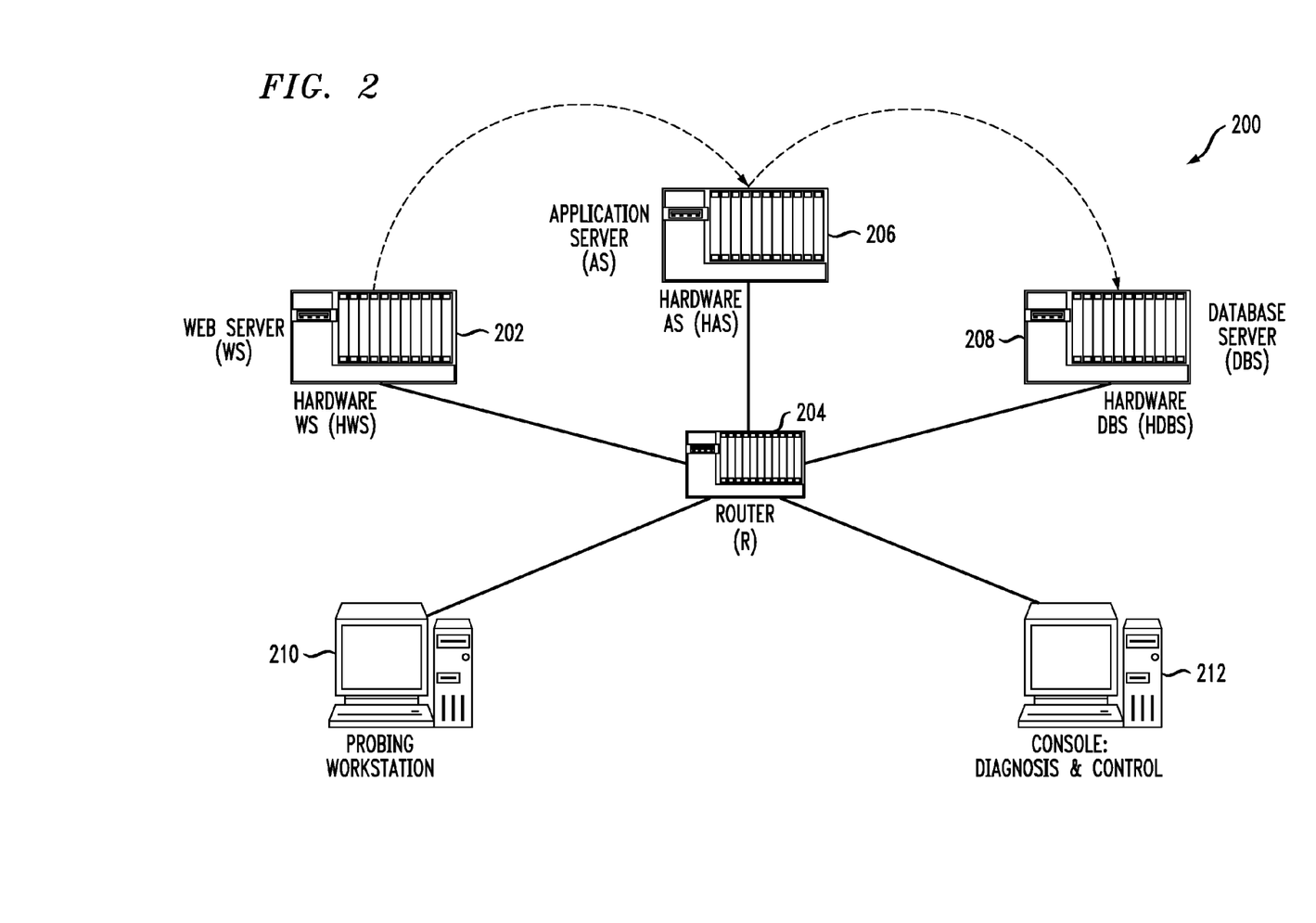
FIG. 2 is a block diagram illustrating a distributed computing system, according to an embodiment of the present invention.

Referring now to FIG. 2, a block diagram illustrates a distributed computing system, according to an embodiment of the present invention. More particularly, FIG. 2 shows an example of a simple distributed system 200 which includes: web server 202 including web server software (WS) and web sever hardware (HWS); router 204 (R); application server 206 (AS) including application server hardware (HAS); a database server 208 including database server software (DBS) and database server hardware (HDBS); probing workstation 210; and a console 212 for analysis and control of the active probing process. It is to be understood that system 200 shown in FIG. 2 is for illustrative purposes only. That is, the techniques of the present invention may be implemented in systems having more or less components.

Figure 3:
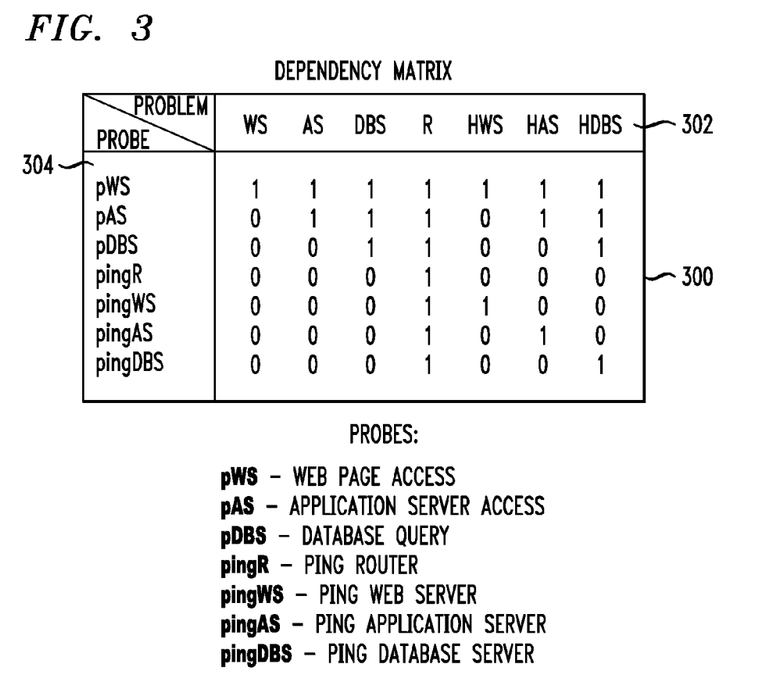
FIG. 3 is a diagram illustrating a set of probes for the distributed computing system of FIG. 2 and a corresponding dependency matrix, according to an embodiment of the present invention.

Referring now to FIG. 3, a diagram illustrates a set of probes for the distributed computing system of FIG. 2 and a corresponding dependency matrix 300, according to an embodiment of the present invention.

The first row 302 in the matrix 300 describes all system components of interest, while the first column 304 describes available probes. An entry Xij in the matrix is set to one if the corresponding probe associated with the i-th row passes through (depends on) the component associated with j-th column; the entry is set to zero otherwise.

Probe pWS is a web page access probe that attempts to open a web page on WS. This also requires running a particular application on AS, and this application, in turn, ends a query to a database on DBS. Thus, the outcome of pWS probe depends on the state (i.e., OK/not OK) of all components, i.e., WS, HWS, AS, HAS, DBS, and HDBS, as well as on the state of the router R. Thus, the row of the probe pWS contains ones in all columns (i.e., fails if any of these components fail). Probe pAS calls an application on AS which sends a query to the database on DBS. Thus, the probe depends on the states of AS, HAS, DBS, HDBS, R. Probe pDBS sends a query to the database on DBS, and thus depends on DBS, HDBS and R. Probes pingR, pingWS, pingAS and pingDBS are just simply "ping" commands to the router and the corresponding servers.

Figure 4:
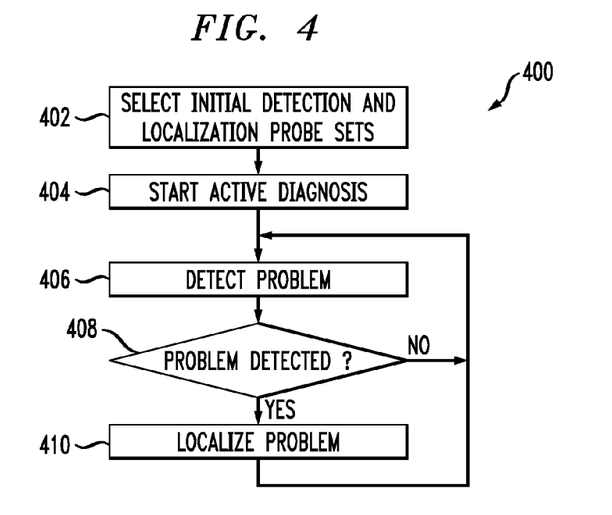
FIG. 4 is a flow diagram illustrating an active probing process, according to an embodiment of the present invention.

Referring now to FIG. 4, a flow diagram illustrates an active probing process, according to an embodiment of the present invention. More particularly, FIG. 4 describes an overall active probing process 400.

In step 402, the detection probes set and the localization probes set are selected. Next, in step 404, active diagnosis is started. Probes from detection probes set are run according to a schedule in order to detect problems (step 406). If a problem is detected (step 408), a problem localization process starts (410). Results of problem localization are reported and the process returns to step 406 to run scheduled detection probes set. Also, if no problem is detected in step 406, the process returns to step 406 to run scheduled detection probes set.

Figure 5:
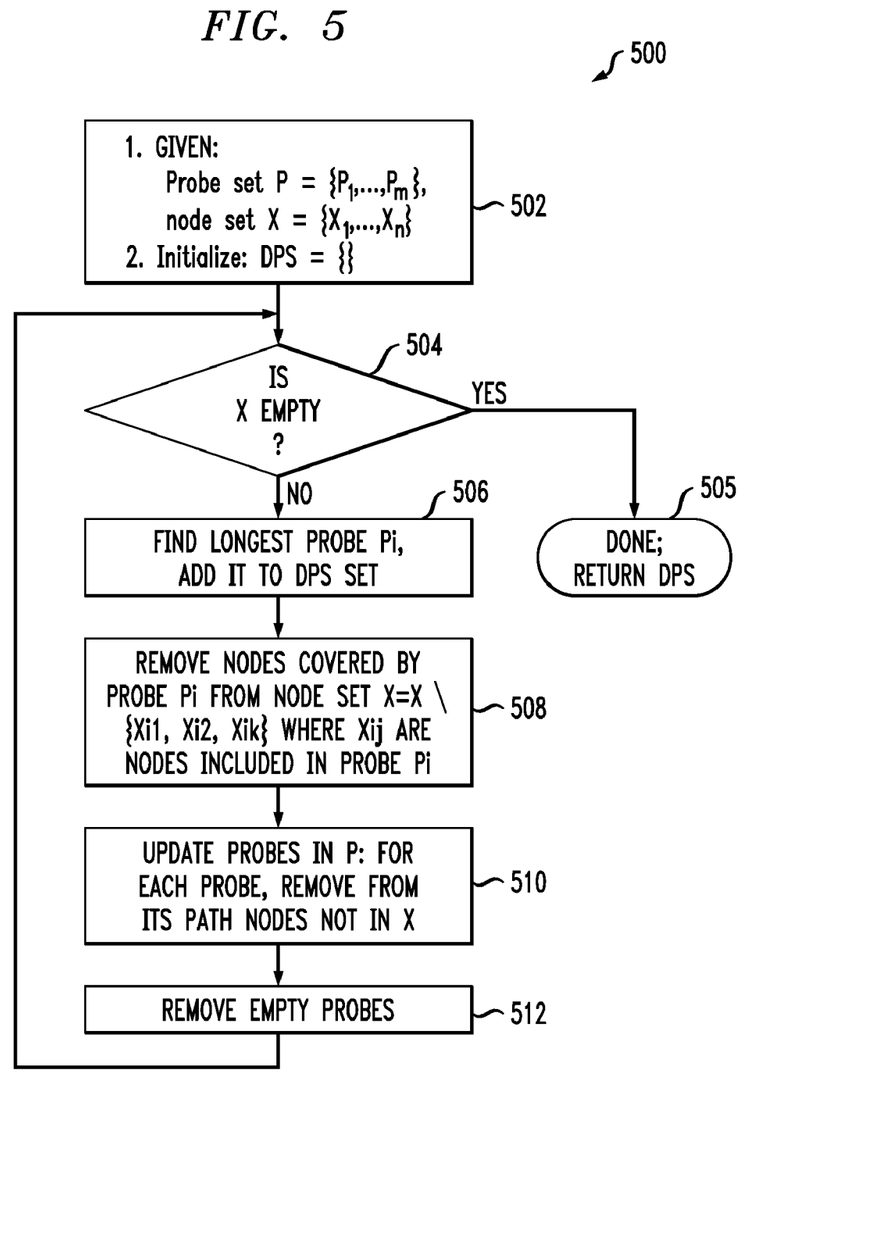
FIG. 5 is a flow diagram illustrating a process for constructing a detection probe set, according to an embodiment of the present invention.

Referring now to FIG. 5, a flow diagram illustrates a process for constructing a detection probe set (DPS), according to an embodiment of the present invention. More particularly, FIG. 5 illustrates a process 500 for constructing the DPS using a greedy approach. As will be evident, a main idea of this process is to select the longest probe next, update the probes set, and then repeat.

The process takes as an input a probes set P and a nodes set X, and initializes DPS to an empty set (step 502). Next, the process checks if nodes set X is empty (step 504). It is to be appreciated that nodes represent system components and node values represent component states (e.g., X1 can represent a server that can be in an OK/not OK state).

If nodes set X is empty, the process returns DPS (step 505).

Otherwise, the process chooses the longest probe Pi and adds the probe to DPS (step 506.

Then, the set X is updated by removing all nodes that belong to the probe Pi (step 508).

Next, the probes in probes set P are updated by removing from the set all nodes that are no longer in X (step 510). Finally, empty probes are removed from P (step 512).

The process continues to loop between steps 504 through 512 until all nodes are covered by probes (X is empty), and returns the resulting DPS (step 505).

Figure 6:
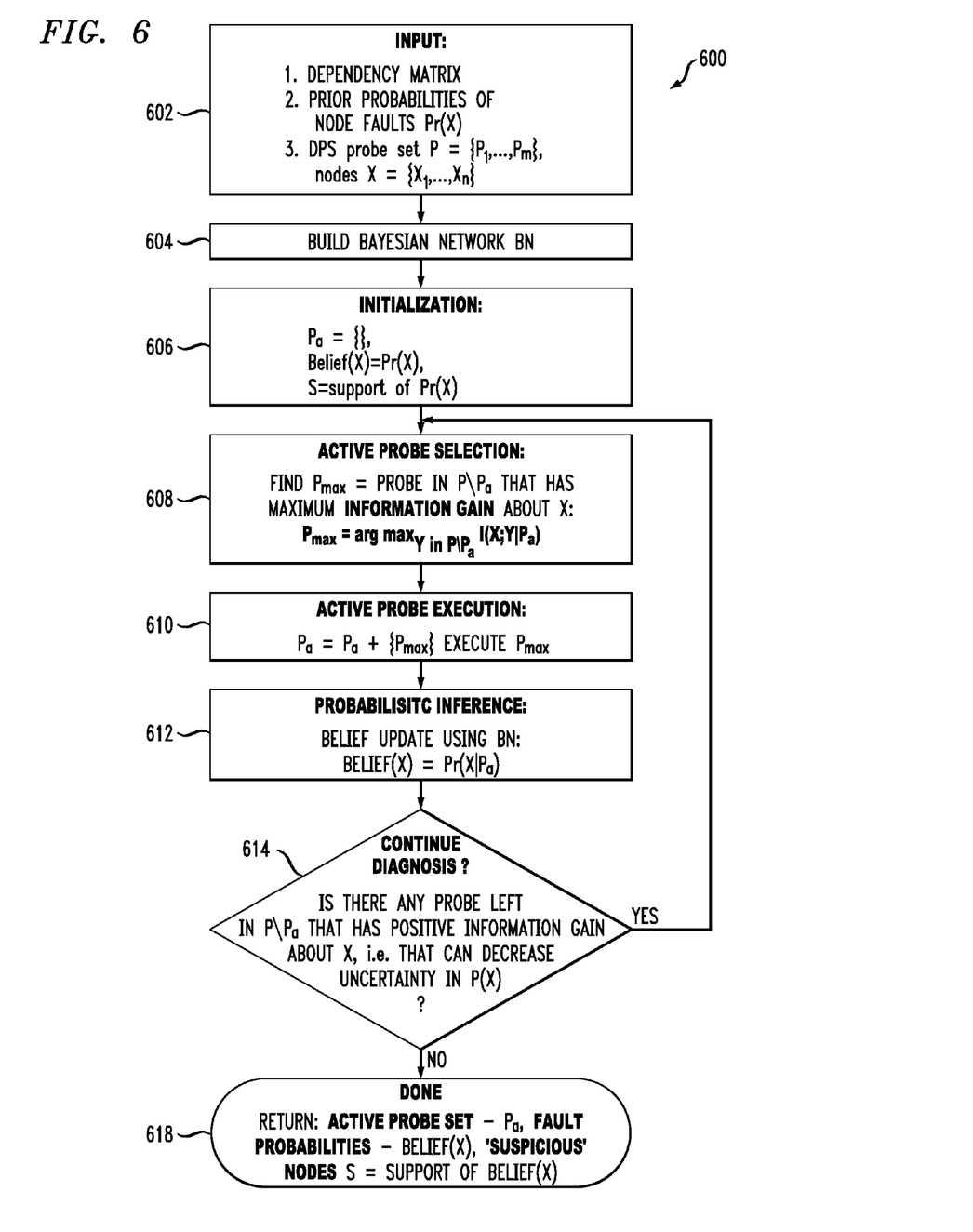
FIG. 6 is a flow diagram illustrating a process for problem localization, according to an embodiment of the present invention.

Referring now to FIG. 6, a flow diagram illustrates a process for problem localization, according to an embodiment of the present invention. More particularly, FIG. 6 describes problem localization or diagnosis process 600 (e.g., step 410 of FIG. 4). As will be evident, a main idea of this process is to select the most-informative probe, update fault probabilities, and then repeat.

The following data are used as an input (step 602) to the problem localization process:

1. Dependency matrix (will be used to build Bayesian network, see description of FIG. 7 below)
2. Prior probabilities of node faults Pr(X).
3. Probe set P={P1, ..., Pm}, node set X={X1, ..., Xn}.

The process the active probe set Pa used during diagnosis, posterior probabilities of fault at each node X, denoted Belief(X), and a set of nodes that have non-zero fault probability ("suspicious" nodes), called the "support" of Belief(X).

As a first step, a Bayesian network BN (used in subsequent probabilistic inference) is constructed using dependency matrix and prior probabilities (step 604). Next, in step 606, an initialization is performed, e.g., the set of active probes Pa is assigned an empty set, probability of fault at each node X, Belief(X), is assigned the prior probability Pr(X), and the support set S is assigned the support of Pr(X) (i.e., the set of all nodes with non-zero P(X)).

In step 608, the process finds a probe (called active probe) that maximizes information gain about the state of the system components, X. The active probe is executed and added to the set of selected active probes Pa (step 610). Next, a probabilistic inference is performed using Bayesian network BN (step 612), which updates the current belief in X given the outcomes of all active probes observed so far, Belief (X)=Pr(X|Pa). Updating of the probabilistic belief may be performed in accordance with standard algorithms, e.g., J. Pearl, "Probabilistic Reasoning in Intelligent Systems," Morgan Kaufmann, San Mateo, Calif., 1988, the disclosure of which is incorporated by reference herein.

In step 614, the process checks if there is any probe left in the initial probe set P, except for already selected probes in Pa, that has positive information gain about X, i.e., that can decrease uncertainty in P(X). If such probe exists, the process returns to step 608. Otherwise, the process proceeds to step 618, where the process returns the active probe set Pa, updated fault probabilities Belief(X), and a set of 'suspicious' nodes S contained in support of Belief(X).

Figure 7:
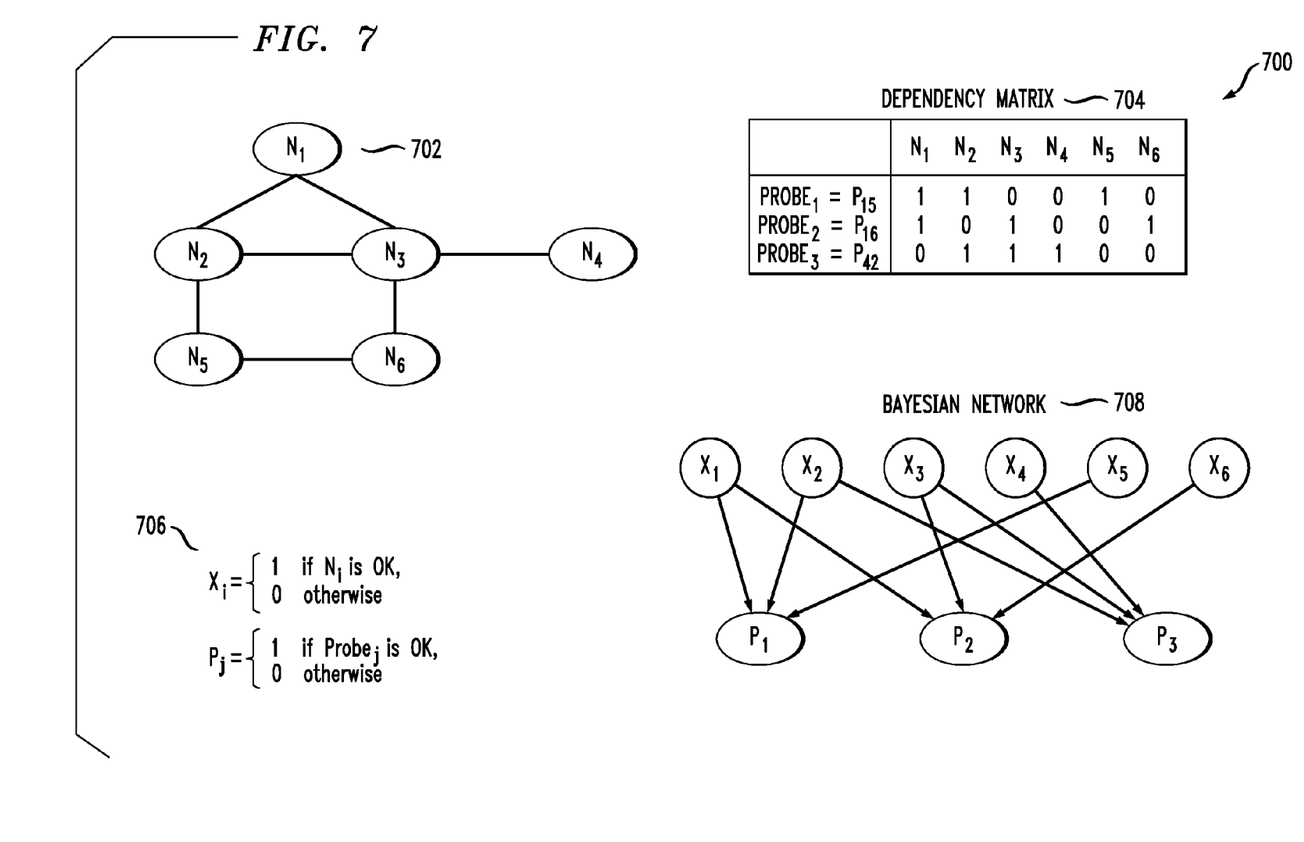
FIG. 7 is a diagram illustrating examples of mapping a dependency matrix to a Bayesian network model, according to an embodiment of the present invention.

Referring now to FIG. 7, a diagram illustrates examples of mapping a dependency matrix to a Bayesian network model, according to an embodiment of the present invention. More particularly, FIG. 7 illustrates a process 700 of constructing a Bayesian network model from a dependency matrix (e.g., step 604 of FIG. 6).

As an example, consider a simple network topology where nodes are components and probes are paths in the network (702). A sample dependency matrix for this system contains three probes (704).

Two sets of random variables are introduced (706), X={X1, ..., Xn} and P={P1, ..., Pm}, where Xi denotes the state of i-th component/node (one if OK, zero if failed), and Pj represents the outcome of j-th probe (again, one if OK, zero if failed).

A Bayesian network model is a directed acyclic graph where nodes correspond to random variables, and directed edges correspond to direct dependencies between the nodes (often denoting causal relationships). Each node Y is also associated with a conditional probability distribution Pr(Y|Parents(Y)) where Parents(Y) is a set of nodes in the graph that "point to" Y. In this case, a Bayesian network that corresponds to a dependency matrix is represented by a bipartite graph (708) where the first layer of nodes corresponds to the components in X, and the second layer of nodes corresponds to the probe outcomes in P. A non-zero entry at i-th column and j-th row in the dependency matrix corresponds to the link between Xi and Pj in the Bayesian network model. For example, node X1 is connected to all probes (P1, P2, and P3) that pass through (depend on) this node.

Figure 8:
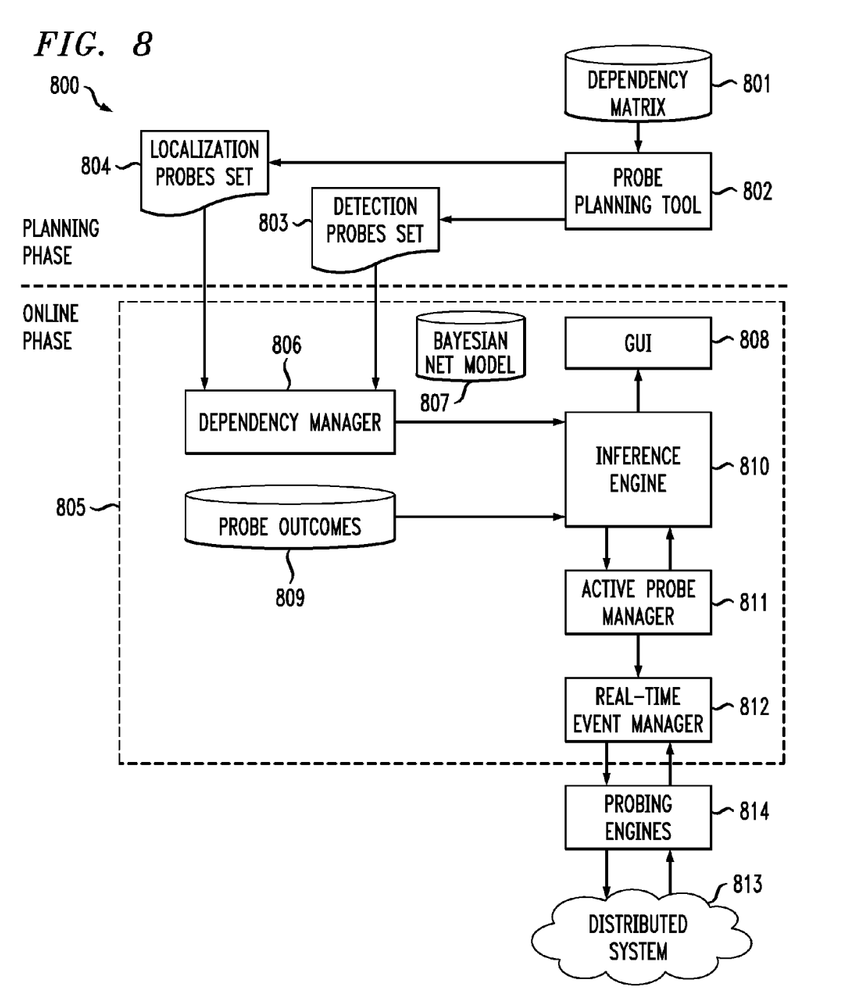
FIG. 8 is a block diagram illustrating a problem diagnosis system architecture, according to an embodiment of the present invention.

Referring now to FIG. 8, a block diagram illustrates a problem diagnosis system architecture, according to an embodiment of the present invention. FIG. 8 shows further details of the environment illustrated in FIG. 1; thus, similarly labeled components have similar functions. The system is also depicted with respect to the two phases described above, i.e., planning phase and online phase.

As shown, system 800 includes: dependency matrix store 801; probe planning tool 802; detection probes set (DPS) 803; localization probes set (LPS) 804; a real-time diagnosis engine 805, itself, including dependency manager 806, Bayesian net model 807, graphical user interface (GUI) 808, probe outcome store 809, inference engine 810, active probe manager 811, and real-time event manager 812; and probing engines 814 which sends out the probes (not shown) to distributed system 813.

In the planning phase, the dependency matrix 801 described above is passed to probe planning tool 802. The probe planning tool generates DPS 803 and LPS 804. It is to be appreciated that one example of an algorithm for use in LPS selection may be the algorithm described in the U.S. patent application identified as Ser. No. 10/676,244, now U.S. Pat. No. 6,167,998, filed on Sep. 30, 2003 and entitled "Problem Determination Using Probing"). A process for DPS construction is described above in the context of FIG. 5.

Both DPS and LPS are passed to dependency manager 806. Dependency manager 806 constructs Bayesian network model 807, as described above in the context of FIG. 7.

Probing engines 814 send probes from the DPS to the distributed system (813) being monitored. Probe outcomes (809) are then passed to real-time event manager 812, as well as to inference engine 810. Inference engine 810 is used to perform inference in the Bayesian network model. If necessary, the inference engine requests an active probe (e.g., see description of process of FIG. 6) by using active probe manager 811. Probe outcomes, as well as results of problem localization (e.g., updated fault probabilities), are reported to the user via GUI 808.

Figure 9:
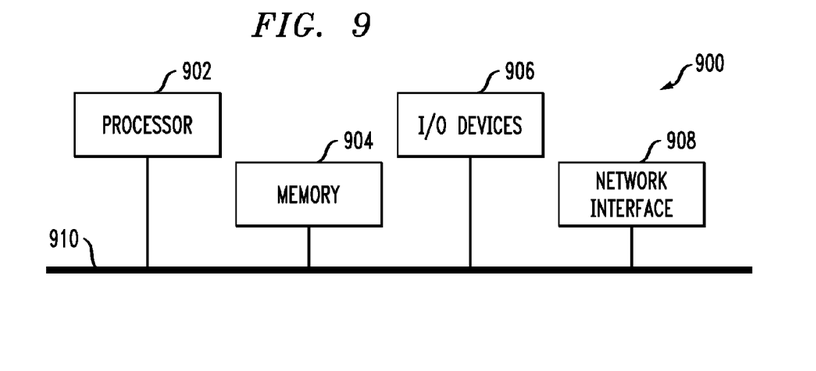
FIG. 9 is a block diagram illustrating a computer system architecture for implementing problem diagnosis systems and methodologies, according to an embodiment of the present invention.

Referring finally to FIG. 9, a block diagram illustrates a computer system architecture for implementing problem diagnosis systems and methodologies, according to an embodiment of the present invention. More particularly, FIG. 9 illustrates an illustrative hardware implementation of a computing system in accordance with which one or more components/methodologies of the present invention (e.g., components/methodologies described in the context of FIGS. 1 through 8) may be implemented.

It is to be understood that such individual components/methodologies may be implemented on one such computer system, or on more than one such computer system. In the case of an implementation in a distributed computing system, the individual computer systems and/or devices may be connected via a suitable network, e.g., the Internet or World Wide Web. However, the system may be realized via private or local networks. The invention is not limited to any particular network.

As shown, computer system 900 may be implemented in accordance with a processor 902, a memory 904, I/O devices 906, and a network interface 908, coupled via a computer bus 910 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit. Such output devices may also be used to present graphical user interfaces such as GUI 808 of FIG. 8.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Advantageously, as illustrated above, the invention provides systems and methods for real-time problem diagnosis using active probing. The method may include a planning phase of selecting initial probe sets, DPS and LPS, based on some optimality criteria. In an on-line phase, the system keeps running probes from the DPS. If a problem is detected, real-time problem localization begins. Real-time problem localization requests active probes until the problem is localized. The method may select a probe set for problem detection by choosing an optimal subset of probes from the set of all available probes so that all problems are "covered," i.e., any failure can be detected. The method may execute probes from DPS sequentially, on a pre-scheduled basis, until some probe indicates a failure somewhere in the system (problem detection). The method may then trigger real-time fault localization once a problem is detected.

Further, the method may use a probabilistic inference engine based on a Bayesian network. The engine may incorporate prior fault probabilities for different system components, and update these probabilities using current probe outcomes. The method may perform optimal online selection of the next probe (using a given optimality criterion) and request the probe execution. This process repeats until the problem is completely determined.

In a particular case of information-gain optimality criterion, the method may select the most-informative next probe (e.g., a probe that maximizes information gain about the partially known system state) based on current probabilities of faults at different components. The method may alternate active probe selection probabilistic inference until the desired level of diagnostic confidence is reached (e.g., a problem is completely determined or sufficiently determined).

It is to be further appreciated that a service provider could provide aspects of the present invention in the following illustrative way. The service provider could provide problem diagnosis (as described herein) services to clients (customers) whose applications and/or web sites the service provider hosts. Such services could be specified via one or more service level agreements (i.e., formal or informal) between the service provider and the client.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method for diagnosing a problem associated with a computing system, the method comprising the steps of:

executing one or more probes in accordance with at least a portion of a previously selected probe schedule for active probing;

when a result of one or more of the probes of the previously selected probe schedule indicates, at least, a potential problem associated with the computing system, selecting in real-time one or more probes which optimize at least one criterion, wherein the step of selecting in real-time one or more probes which optimize at least one criterion further comprises the step of selecting in real-time one or more probes which maximize information gain relating to the potential problem;

executing the one or more selected probes so as to diagnose the potential problem; analyzing results of the execution of the one or more selected probes using a probabilistic inference and using one or more prior fault probabilities for one or more system components; wherein prior to the execution of the probes, a problem detection probe set (DPS) and a problem localization probe set (LPS) are pre selected, wherein probes of the DPS are intended to cover any given problem and probes of the LPS are intended to localize a problem detected by a probe of the DPS; and repeating the step of selecting in real-time one or more probes which optimize at least one criterion and the step of analyzing results of the execution of the one or more selected probes until a particular level of diagnostic confidence is reached.

* * * * *